United States Patent [19]

Zur

[11] Patent Number: 5,341,831
[45] Date of Patent: Aug. 30, 1994

[54] METHOD AND APPARATUS FOR IRRIGATION CONTROL

[75] Inventor: Benjamin Zur, Kiryat-Tivon, Israel

[73] Assignee: Technion Research and Development Foundation Ltd., Haifa, Israel

[21] Appl. No.: 878,094

[22] Filed: May 4, 1992

[30] Foreign Application Priority Data

May 2, 1991 [IL] Israel .................. 098027

[51] Int. Cl.$^5$ ............................... A01G 25/16
[52] U.S. Cl. ...................... 137/78.3; 239/63
[58] Field of Search ............ 137/78.3; 239/63

[56] References Cited

U.S. PATENT DOCUMENTS

| | | | |
|---|---|---|---|
| 3,771,548 | 11/1973 | Rauchwerger | 137/78.3 |
| 3,777,976 | 12/1973 | Milovancevic | 137/78.3 |
| 4,693,419 | 9/1987 | Weintraub et al. | 137/78.3 |
| 4,892,113 | 1/1990 | Fattahi | 137/78.3 |

FOREIGN PATENT DOCUMENTS 1177789  4/1959  France .................... 239/63

*Primary Examiner*—A. Michael Chambers
*Attorney, Agent, or Firm*—Robert J. Koch

[57] ABSTRACT

A method and apparatus for controlling an irrigation cycle of an area of soil or like material are disclosed. The irrigation cycle may stop as soon as a wetting front of the applied fluid reaches a depth $Z_i$. The wetting front may continue downward into the soil by drainage and percolation to a predetermined final depth $Z_f$. The irrigation cycle controlling apparatus may include an irrigation controller such as a water valve and a wetness sensor configured as a tubular rod. The wetness sensor may be composed of a plurality of porous, hydrophilic plastic material rings, which are separated from each other by a plurality of non-porous, non-conductive rings. A pair of electrodes may contact the top and bottom surfaces of each porous ring and may emit signals to a central processing unit in accordance with the degree of soil wetness. A switching circuit may be connected to the central processing unit and to each of the electrodes. The central processing unit may cause irrigation to stop as soon as the wetting front has reached the depth $Z_i$. A liquid crystal display and/or external terminal may also be connected to the central processing unit.

27 Claims, 3 Drawing Sheets

POSITION OF WETTING FRONT AT
CONSTANT INITIAL MOISTURE ($O_i$)

POSITION OF WETTING FRONT AT
DIFFERENT INITIAL MOISTURES

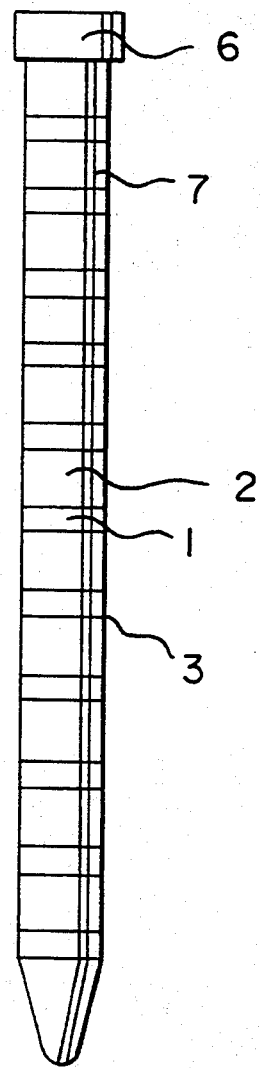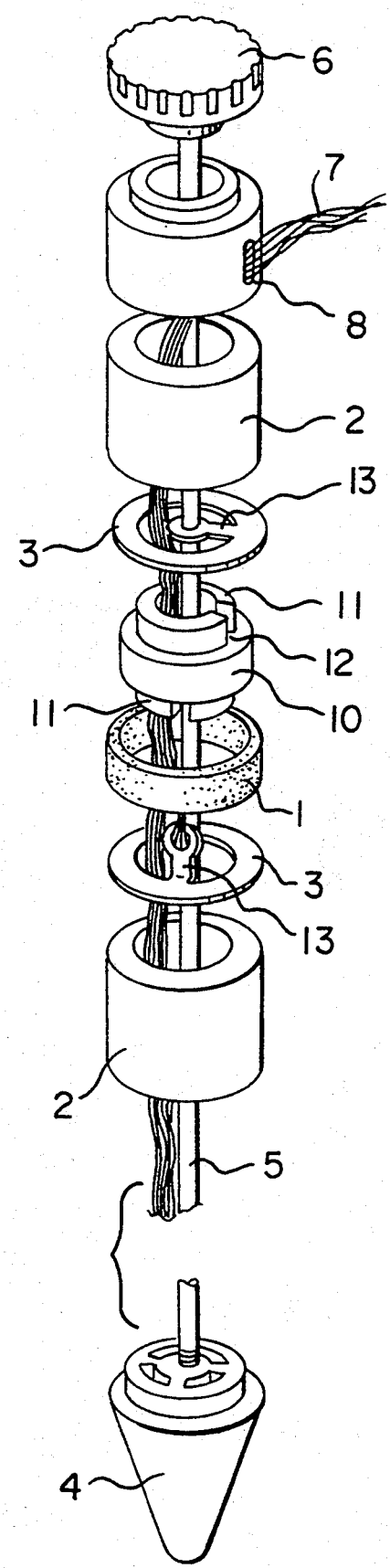
FIG. 3
FIG. 4

METHOD AND APPARATUS FOR IRRIGATION CONTROL

BACKGROUND OF THE INVENTION

1. Field of the Invention

The invention relates to an irrigation control system destined to ensure that the quantity of water applied during irrigation of a given planted area represents the correct amount needed to rewet the soil profile to a predetermined maximal depth. Under normal conditions this maximal depth is the soil depth in which 85% of the active plant roots are present. The invention relates particularly to a control system capable of automatically stopping an irrigation cycle as soon as the wetting front reaches a depth above the final predetermined depth, from where the water will continue to drain and percolate down to the required depth containing the plant roots. It relates furthermore to a system adapted, under certain conditions, to start irrigation automatically whenever the water content distribution with depth should drop below a predetermined value.

2. Description of the Related Technology

In semi-arid countries with no rainfall during several months of the year artificial irrigation has been practiced for thousand of years. In modern times, when irrigated areas are rapidly increasing because of the increasing demand for fruits and vegetables and owing to urbanisation and industrialisation, water resources for irrigation are becoming scarce, and farmers are under pressure to use the available water frugally to the best advantage. Presently, the farmer is lacking the means to assure that the amount of water he applies in an irrigation is actually the amount needed to rewet the soil profile to the desired depth. In the recent past, various equipment has been designed for automatic irrigation, actuated by the sensed soil water content and/or by electronic timing. They include soil humidity sensors such as tensiometers or resistance blocks which are driven into the soil down to a depth at which the roots are most active and which emit signals for starting irrigation whenever the soil water content or soil water potential drop below a predesignated level. Another way of starting irrigation is by means of electronic timers which actuate valves or pumps after a predesignated time interval measured from the last irrigation. Both methods lack the means for stopping the irrigation process as soon as the quantity of water applied to the soil is sufficient to rewet the soil profile, and usually result in over-irrigation and waste of water resources.

SUMMARY OF THE INVENTION

Our invention is based on the theoretical and experimental investigations carried out by us during the past few years in respect of the progress of the wetting front during and after cessation of irrigation. We showed that the final depth of the wetting front on the next day depends on four soil parameters: hydraulic conductivity, stable water content during irrigation which depends on the rate of water application, water content at field capacity and water content prior to start of irrigation. The first three parameters are constant for a given combination of soil and the irrigation system and can be determined for once for each site and system. However, the fourth parameter, i.e. the initial water content is variable and depends on the period since the aforegoing irrigation, the weather and the state of the crop, and its determination is cumbersome and time consuming.

However, we found that it is possible to estimate the initial water content from measurements of the velocity of advance of the wetting front during irrigation, and that the time changes in its position during the irrigation as well as the draining stages depend on the type of soil, the rate of application and the initial water content. Since the velocity of advance during irrigation is approximately constant and gradually slows down during drainage after irrigation stoppage, a time/depth diagram shows a constant slope down to the depth at which irrigation is stopped, and an asymptotic curve down to the final depth during drainage. For a given field with a known soil type and known irrigation system a typical family of curves of different slopes (velocity) can show the wetting front position in relation to different, initial soil water content.

It can be readily seen that the relationship between the depth of the wetting front at the end of an irrigation period $Zi$, and the final depth $Zf$ reached on the following day after cessation of irrigation, is proportional to the velocity of advance $v$, all other parameters being constant for a given soil and a given rate of irrigation, and can be expressed by the following equation:

$$Zi/Zf = Cx[(O_d + IR/v - O_1)/IR] \times v,$$

wherein C is a coefficient characteristic of the site; $O_d$ is the water content at field capacity, IR the rate of water application, and $O_1$ the stable water content during irrigation. The method and the appropriate apparatus developed by us will enable any farmer to irrigate every one of his fields to the desired final depth and thereby to save considerable amount of water.

Based on these investigations it is the object of the present invention to provide apparatus for sensing the progress of the wetting front, to transmit the signals to processor means which are programmed to close the valves of an irrigation system at the calculated depth of the wetting front $Zi$, from where water will percolate to the required depth $Zf$.

It is a further object to make the processor means capable of checking the final depth reached by the wetting front, comparing it with the programmed wetting front and correcting the program accordingly.

It is a further object to provide a measuring instrument of sufficient accuracy which will not deteriorate within a reasonable time, and which will have sufficient strength and resistance for repeated insertion into the soil.

It is still another object to provide the processor means with means to handle different types of soils and different plant root systems in accordance with the planned final depth of the wetting front $Zf$.

The method of controlling an irrigation cycle by stopping irrigation as soon as the wetting front extends down to a depth from where it can continue down to the required final depth by draining and percolation, including the steps of:

- irrigating a selected site at a given application rate,
- measuring at predetermined time intervals the conductivity or resistance of individual wetness sensing elements positioned in spaced relationship at progressing soil depth, by electric pulses of a given voltage,
- estimating the position of the wetting front at each time interval base on changes in relative readings of eachs wetness sensing element, computing the velocity of advance of the wetting front from data received from the sensing elements in respect of the position of the wetting front at each time interval, estimating the distribution of the initial soil water content at different depths based on the distribution of wetting front velocities, identifying the specific curve characteristic to the irrigated site relating to the position of the wetting front to infiltration time at the given infiltration rate and the calculated distribution of water content, computing the ratio Zi to Zf and the resulting value of Zi for the specific irrigation cycle, and causing a signal to be issued for stopping the irrigation as soon as the wetting front reaches the depth Zi.

The equipment for irrigation control defining the depth in the soil at which irrigation is to be stopped in order to permit the wetting front to reach the required depth by percolation after cessation of an irrigation cycle includes, a wetness sensor to be driven vertically into the soil and provided with a plurality of spaced apart sensing elements positioned at consecutive points of depth in the soil, wherein each sensing element includes a porous hydrophilic body and a pair of electrodes contacting opposite surfaces thereof, a switching circuit electrically connected by wiring to each pair of electrodes and emitting at equal time intervals successively to each pair of electrodes pulses of different voltage potential causing an increased current to pass through said porous body after a predesignated saturation has been reached, and conveying to a central processing unit data signals in respect of such increased current passing through every sensor element down to the depth of the advancing wetting front, a central processing unit including data storage and programmed to compute the velocity of the wetting front from the received data and the time elapsed from the start of irrigation and issuing a signal to stop irrigation as soon as the received data signals indicate progress of the wetting front to the depth from where the continuing water percolation will reach the predesignated irrigation depth, a power source and a switching mechanism.

It should be noted that the conductivity of the porous hydrophilic bodies depends on their water content which at no time is absolutely zero, but that on arrival of the wetting front at any individual element the conductivity rises considerably which causes a sudden increase of current passing therethrough and which is registered and transmitted as a signal from the switching circuit to the processing unit.

In a preferred embodiment of the equipment the switching circuit is programmed to continue emitting electric pulses to the sensing elements after cessation of irrigation at considerable larger intervals, and to convey similar data signals to the central processing unit, thereby indicating the progress of the wetting front to the final depth, while the processor is programmed to compare the final depth with the required depth and to correct the program of the following irrigation cycle.

A preferred embodiment of the wetness sensor includes a plurality of annular bodies of a porous, hydrophilic plastic material separated by annular, non-conductive plastic spacers and annular, flat electrodes positioned in the joints between the bodies, the assembled components forming a tubular body. Each electrode is connected to the switching circuit by wiring extending to the top through the hollow interior, and the lower end of the tubular body is preferably cone-shaped for ready insertion into the soil.

In a simplified embodiment of the wetness sensor all components, i.e. the sensor elements and the spacers, are connected to form a cylindrical rod by a through-going metallic bolt which is conductively connected to every second—as for instance every upper—electrode, while the remaining or first electrodes are connected to the switching circuit by separate wire conductors. All upper electrodes are supplied a given voltage by the bolt, which is advantageously connected to the neutral line, while the other electrodes may be connected to the live line of a different voltage potential, causing an increased current to pass through the porous body upon a predesignated saturation by water.

Preferred dimensions of the wetness sensor are a diameter of about 30 mm and a length between 0.5 and 1.5 m, in accordance with the required depth of irrigation. For instance, since the roots of grass in a lawn do not reach beyond 0.3 m, a short specimen can be used, while for fruit trees the long type would be suitable.

Since it could be shown that the final predesignated depth was generally reached within 24 hours after cessation of irrigation, i.e. the day after the irrigation cycle, electric pulses of very short duration are preferably conveyed to the electrodes of the sensors at 5 minutes' intervals until the end of the irrigation cycle; from here on it is advisable to send pulses every hour only, owing to the slowed down advance of the wetting front. This will save electric energy which is usually provided by storage batteries.

BRIEF DESCRIPTION OF THE DRAWINGS

FIG. 3 is a side view of the humidity sensing apparatus, FIG. 4 is an exploded view of the apparatus shown in FIG. 3.

DETAILED DESCRIPTION OF THE PREFERRED EMBODIMENT

Figure 1:
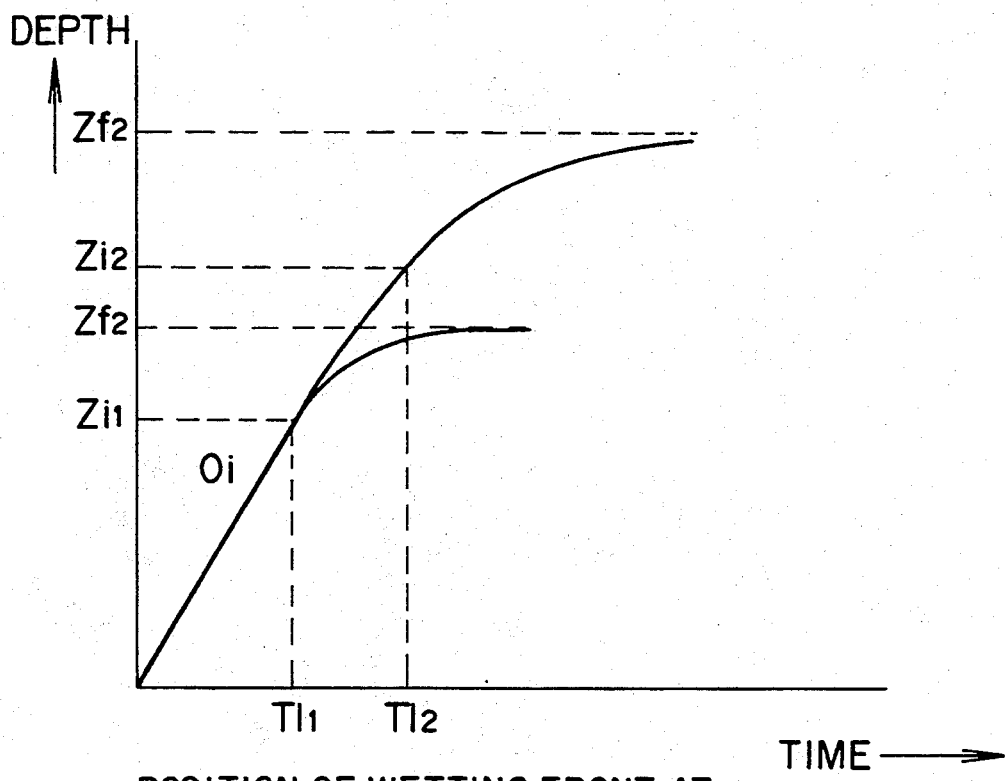
FIG. 1 is a diagram showing the progress of the wetting front as a function of time for a constant rate of irrigation, with respect to two different depths of final irrigation.

The diagram of FIG. 1 shows two curves of the progress of the wetting front for the same type of soil but for different final depth of irrigation Zf. Herein the field capacity, irrigation rate and the stable water content during irrigation are constant which is expressed by the straight velocity curve of equal inclination. The ratio Zf/Zi is identical in both cases as defined by equation (1).

Figure 2:
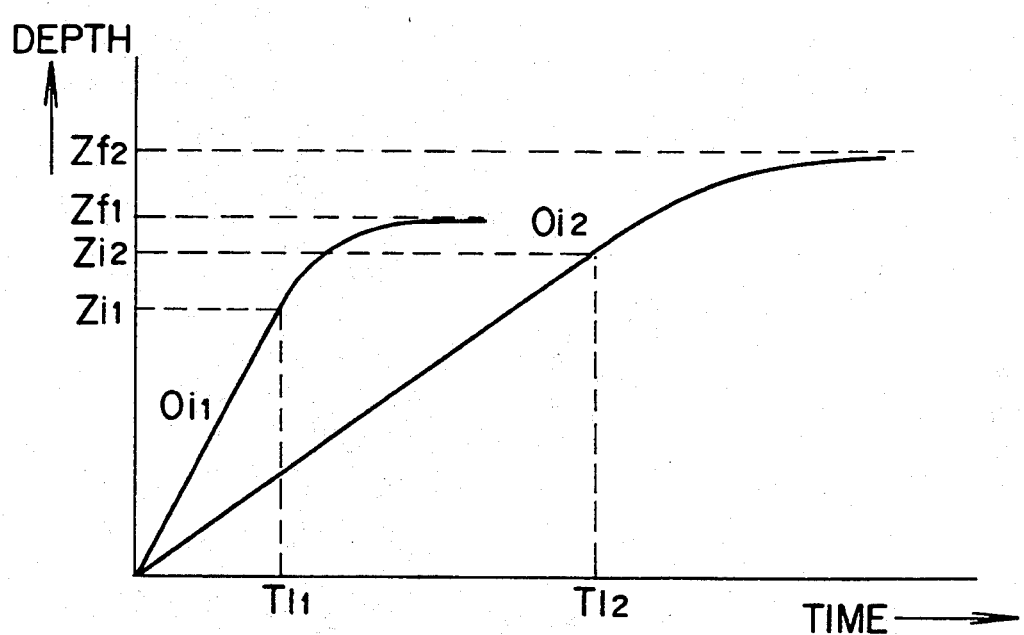
FIG. 2 is a diagram showing different velocities of the wetting front with respect to soils with different initial water contents.

The diagram of FIG. 2, on the other hand, shows two curves of different velocity of the wetting fronts. Herein the rate of irrigation and the field capacity are identical, but the stable water content during irrigation differs in both cases due to a different kind of soil. Again, as in the foregoing diagram the relation of the final front depth to the initial front depth is identical, as expressed by equation (1). FIGS. 3 and 4 illustrate the apparatus for measuring the progress of the wetting front. The apparatus is in the form of a long, hollow cylindrical rod with a plurality of sensing elements 1 separated by non-conductive spacers 2. Each sensor element includes a short hollow cylinder of a hydrophilic porous plastic material having ring-shaped metal electrodes 3 and 3' attached to both ends. FIG. 4 shows a single sensing element 1 positioned between two hollow cylindrical spacers 2, the porous cylinder and the electrodes being mounted on a support block 10 in the form of a central cylinder of an outside diameter coextensive with the inner diameter of the porous cylinder and two short collars 11 extending therefrom on top and bottom. Each collar is slotted by a slot 12 for accommodation of the terminal 13 of each ring-shaped electrode 3. The collars 11 engage with the inside of the spacers 2 which are in the form of hollow cylinders of a non-conductive plastic or ceramic material, and keep all components in line. For clearer understanding only one sensing element and two spacers are shown, but it is understood that a large number of sensors and spacers are incorporated in one apparatus in accordance with the required length of the rod. The rod is assembled from its components by a long bolt 5 of a conductive metal which engages with a conical bottom piece 4 into which it is screwed by the handle 6 at its top. This bolt serves as an electrical conductor and is connected to every second electrode, in the present case the upper electrode 3, by extending through an eye at the end of the terminal 13. The remaining electrodes, in the present case the lower ones, are conductively connected to the switching circuit by wire conductors 7 which extend through the hollow interior of the cylinder and exit therefrom through an opening 8 in the uppermost spacer into the open above ground.

Figure 5:
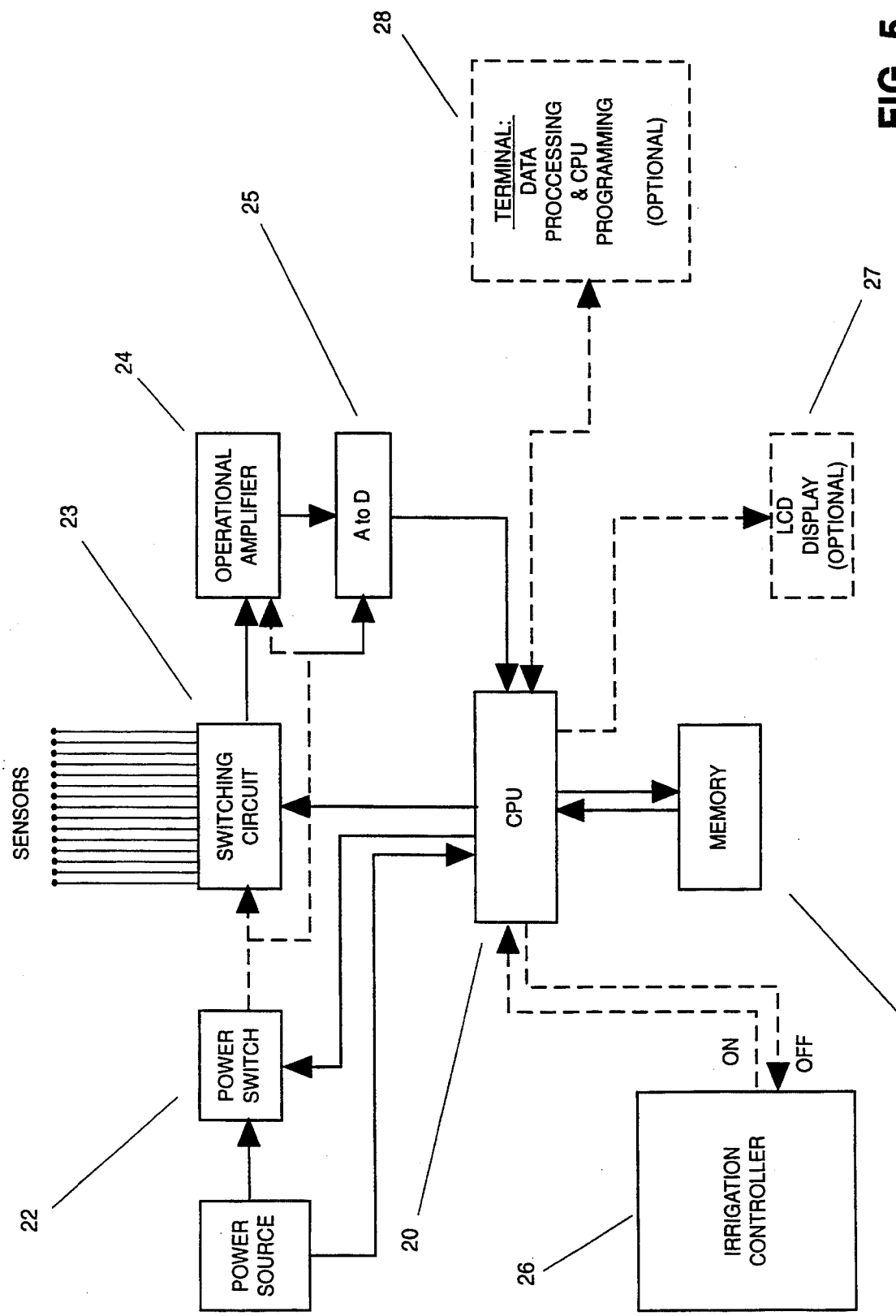
FIG. 5 is a schematic diagram of the data processing and operating assembly.

FIG. 5 illustrates the operation of the irrigation cycle by a processing unit connected to the humidity sensing apparatus by wiring as described in the foregoing section. A central processing unit (CPU) 20 may contain which a time piece and a program which cannot be wiped out by interruption of the electric supply. A memory 21 is directly connected to the CPU which is supplied data which are safe and cannot be wiped out by failure of the electric supply. Both the CPU and the memory remain operative continuously, while the remaining components appearing in the diagram are operated only during irrigation and afterwards and are started by the power switch 22 upon a signal issued by the controller. With the object of measuring the progress of the wetting front the switching circuit 23 is energized by the CPU at predesignated time intervals by a signal in the form of a square wave which causes a short current to be sent through each sensing element in successive order. The conductivity of every element is measured, related to the degree of wetness of the surrounding soil and transmitted to the operational amplifier 24 which amplifies the signal and eliminates noise. From here the signals are transmitted to the CPU after having been converted from analog to digital by an analog to digital (A to D) converter 25 and are stored for further processing, and the CPU stops the switching circuit until the next scanning operation. From the received data the processor computes the velocity of the wetting front and compares the depth/time curve with data stored in the memory in relation to the final depth to be reached. As soon as the depth Zi has been measured by the wetness sensing apparatus and conveyed to the CPU, the latter issues a signal to an operation unit or irrigation controller 26 to stop irrigation, which can be done by interruption of pumping, closing of valve a or the like.

After cessation of irrigation the wetting front continues to progress at a gradually slowing rate and this progress is measured by the same method during the following 24 hours, but at larger intervals, as e.g. every hour. The resulting final depth is compared with the programmed depth data and assists in correcting the data stored in the memory. The CPU can now be programmed for the start of the next irrigation cycle.

Electric pulses of about 60 msec are preferably emitted to the electrodes at 5 minutes intervals during the actual irrigation cycle and at one hour's intervals during the successive 24 hours until the final depth has been reached.

According to the preferred embodiment, optional accessories such as a liquid crystal display 27 and an external terminal 28 may be connected to CPU 20.

The optional accessories serve for visual demonstration of the irrigation progress, as for instance in the form of curves, and for correction and change of the program in accordance with data received.

It will be understood that both the wetness sensing apparatus as well as the processing unit shown in the foregoing represent only examples of the components for irrigation control. They may be changed and amended by a person skilled in the art, as long as the principle of controlled stoppage of irrigation before final percolation and draining of the wetting front is maintained.

I claim:

1. A method of controlling an irrigation cycle of an area comprising the steps of:
    starting irrigation of said area at a known application rate,
    measuring a downward directed advance of a wetting front at predetermined time intervals by means of at least two wetness sensing elements positioned in spaced apart relationship at progressing depth,
    conveying signals corresponding to the advance of the wetting front from said wetness sensing elements to a processor, and
    conveying a signal from said processor to an irrigation controller to stop irrigation as soon as the wetting front has advanced to a depth Zi.

2. The method of controlling an irrigation cycle according to claim 1, further comprising the steps of:
    estimating a position of the wetting front at each time based on changes in readings from the wetness sensing elements,
    computing a velocity of advance of the wetting front from data received from the wetness sensing elements with respect to the position of the wetting front at each time interval,
    estimating a distribution of an initial soil water content at different depths based on a distribution of wetting front velocity,
    identifying a specific curve characteristic of the irrigated field relating to the position of the wetting front to infiltration time at an infiltration rate and the calculated distribution of water content,
    computing a ratio Zi to a predetermined final depth Zf and the resulting value of Zi for an irrigation cycle, and
    issuing a signal for stopping irrigation as soon as the wetting front reaches the depth Zi.

3. The method of controlling irrigation according to claim 2, further comprising the step of emitting electric pulses to the wetness sensing elements at time intervals of about 5minutes.

4. The method of controlling irrigation according to claim 2, further comprising the steps of:
measuring the progress of the position of said wetting front after cessation of irrigation by the wetness sensing elements down to the final depth Zf,
conveying data signals received from the wetness sensing elements to the processor configured to compare the received data signals defining said final depth with programmed final depth data and to correct a program with respect to the following irrigation cycles.

5. The method of controlling irrigation according to claim 1, further comprising the steps of:
measuring the progress of the position of said wetting front after cessation of irrigation by the wetness sensing elements to a final depth Zf,
conveying data signals received from the wetness sensing elements to the processor configured to compare the received data signals defining said final depth with programmed final depth data and to correct a program with respect to the following irrigation cycles.

6. The method of controlling irrigation according to claim 4, wherein the step of measuring the progress of the position of said wetting front after cessation of irrigation further comprises the step of emitting electric pulses to the wetness sensing elements at time intervals of about one hour.

7. The method of controlling irrigation according to claim 1, further comprising the step of emitting electric pulses of about 60 msec duration to the wetness sensing elements.

8. The method of controlling irrigation according to claim 1, further comprising the steps of:
emitting electric pulses to the wetness sensing elements at time intervals of about 5 minutes;
ceasing emission of electric pulses to the wetness sensing elements at time intervals of about 5 minutes, when the wetting front has advanced to the depth $Z_i$; and
emitting electric pulses to the wetness sensing elements at time intervals of about one hour.

9. The method of controlling irrigation according to claim 1, wherein the step of measuring a downward directed advance of a wetting front at predetermined time intervals further comprises the step of:
measuring the conductivity of the wetness sensing elements at predetermined time intervals.

10. An irrigation cycle controlling apparatus comprising:
a wetness sensor exhibiting a plurality of spaced-apart sensor elements, wherein each of said sensor elements includes a porous, hydrophilic body and a pair of electrodes contacting opposite surfaces of said body,
a switching circuit connected to each of said sensor elements and programmed to emit pulses of different potential at identical time intervals successively across each pair of electrodes, and
a central processing unit connected to said switching circuit programmed to locate the position of a wetting front and to compute the advance of the wetting front to a given sensor element.

11. The irrigation cycle controlling apparatus according to claim 10, wherein said central processing unit is configured to locate a position of a wetting front based on relative changes of current passing through each of said sensor elements.

12. The irrigation cycle controlling apparatus according to claim 10, wherein said wetness sensor is configured as a tubular rod including a plurality of annular bodies of a porous, hydrophilic plastic material separated from each other by annular spacers of a non-conductive, non-porous material and a pair of flat, annular electrodes positioned on the annular opposing surfaces of each annular sensor body, and conductors extending through the hollow interior of said tubular rod from each said electrode to said switching circuit.

13. The irrigation cycle controlling apparatus according to claim 12 wherein said wetness sensor further comprises:
a long bolt;
a bottom piece exhibiting a tapered edge; and
a top cover, said long bolt engaging said bottom piece and said top cover.

14. The irrigation cycle controlling apparatus according to claim 13 wherein said long bolt is made of an electrically conductive material.

15. The irrigation cycle controlling apparatus according to claim 12, wherein said wetness sensor further comprises at least one annular support block exhibiting at least one collar and surrounded by said porous, hydrophilic body.

16. The irrigation cycle controlling apparatus according to claim 15, wherein said at least one support block collar exhibits a slot.

17. The irrigation cycle controlling apparatus according to claim 10, further comprising a liquid crystal display connected to said central processing unit.

18. The irrigation cycle controlling apparatus according to claim 10, further comprising an external terminal connected to said central processing unit monitor at real time and to control the computed depth $Z_i$ and the designated.

19. An irrigation cycle controlling apparatus according to claim 7, wherein said wetness sensor exhibits a plurality of spaced-apart sensor elements, each of said sensor elements includes:
a porous, hydrophilic body; and
a pair of electrodes contacting opposite surfaces of said body, said porous hydrophilic body being configured so the resistance of said body to current flow is proportional to a degree of water saturation of said body in dynamic equilibrium with a degree of saturation of surrounding soil.

20. An irrigation cycle controlling apparatus according to claim 7, wherein said wetness sensor is configured as a tubular rod exhibiting:
a plurality of spaced-apart sensor elements, each of said sensor elements includes:
a porous, hydrophilic annular body, and
a pair of flat, annular electrodes contacting opposite surfaces of said annular body;
a plurality of non-conductive, non-porous annular spacers; and
a conical bottom piece contacting one of said annular spacers, wherein each of said sensor elements contacts at least one of said annular spacers.

21. An irrigation cycle controlling apparatus according to claim 7, wherein said at least one sensor element is an annular sensor element exhibiting:

a porous, hydrophilic annular body;

a pair of flat, annular electrodes contacting opposite surfaces of said annular body; and an annular support block exhibiting a plurality of slotted collars and surrounded by said annular body.

22. A method of controlling an irrigation cycle of a soil area comprising the steps of:

starting irrigation by applying a fluid to the soil area at a known application rate;

determining a downwardly directed advance rate of a wetting front of the fluid at predetermined time intervals by means of a processor receiving information from at least two wetness sensing elements positioned in spaced apart relationship at progressing depth;

determining a depth, Zi, at which irrigation may be stopped so that said wetting front reaches only a predetermined depth, Zf, based on said advance rate;

stopping irrigation in response to determining the wetting front has advanced to said depth, Zi.

23. The method of controlling an irrigation cycle according to claim 22, comprising at least the steps of:

determining the wetting front advance at predetermined time intervals of a first duration;

determining the wetting front has advanced to a depth Zi; and determining the wetting front advance at predetermined time intervals of a second duration longer than the first duration.

24. The method of controlling an irrigation cycle according to claim 22, further comprising the step of:

restarting irrigation of the soil area upon detection of a predetermined condition.

25. The method of controlling an irrigation cycle according to claim 24, wherein the step of restarting irrigation of the soil area comprises at least the step of:

restarting irrigation of the soil area upon detection of a predetermined water content in the soil area.

26. The method of controlling an irrigation cycle according to claim 22, further comprising the step of:

determining a velocity of advance of the wetting front.

27. The method of controlling an irrigation cycle according to claim 22, further comprising the step of:

recalculating the depth, Zi, according to the following relationship:

$$\frac{Zi}{Zf} = C \times \left[ \frac{\left( O_d + \frac{IR}{v} - O_1 \right)}{IR} \right] \times v$$

wherein:

Zf is a final depth;

C is a coefficient characteristic of the soil area;

$O_d$ is a water content at field capacity;

IR is a rate of application;

v is a velocity of wetting front advance; and $O_1$ is a stable water content during irrigation.

* * * * *